United States Patent
Khailany et al.

(10) Patent No.: US 9,323,679 B2
(45) Date of Patent: Apr. 26, 2016

(54) SYSTEM, METHOD, AND COMPUTER PROGRAM PRODUCT FOR MANAGING CACHE MISS REQUESTS

(75) Inventors: Brucek Kurdo Khailany, San Francisco, CA (US); Ronny Meir Krashinsky, San Francisco, CA (US); James David Balfour, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 118 days.

(21) Appl. No.: 13/585,738

(22) Filed: Aug. 14, 2012

(65) Prior Publication Data

US 2014/0052918 A1 Feb. 20, 2014

(51) Int. Cl.
*G06F 12/08* (2006.01)

(52) U.S. Cl.
CPC ........ *G06F 12/0859* (2013.01); *G06F 12/0811* (2013.01); *Y02B 60/1225* (2013.01)

(58) Field of Classification Search
CPC .............. G06F 9/3885; G06F 9/30109; G06F 9/30112; G06F 9/30167; G06F 8/4442; G06F 9/3004; G06F 12/0875; G06F 12/0886; G06F 9/30; G06F 9/34; G06F 12/02; G06F 15/7832; G06F 2009/45583; G06F 9/4426; G06F 9/45533; G06F 9/45558; G06F 12/10; G06F 12/109; G06F 17/5068; G06F 17/5072; G06F 17/5081; G06F 2217/12; G06F 9/30025; G06F 9/35; G06F 9/38; G06F 9/4425; G06F 9/455; G06F 12/0292; G06F 5/06; G06F 12/0811; G06F 12/0866; G06F 5/065; G06F 9/3806; G06F 12/0859; H04L 49/9042

USPC .......................... 711/119, 122, 123, 133, 134
See application file for complete search history.

(56) References Cited

U.S. PATENT DOCUMENTS

| | | | | |
|---|---|---|---|---|
| 5,809,530 | A * | 9/1998 | Samra et al. ................... | 711/140 |
| 6,145,054 | A * | 11/2000 | Mehrotra et al. ............. | 711/119 |
| 6,336,168 | B1 * | 1/2002 | Frederick et al. ............. | 711/141 |
| 7,571,284 | B1 * | 8/2009 | Olson et al. ................... | 711/122 |
| 7,721,048 | B1 * | 5/2010 | Sendag et al. ................ | 711/133 |
| 8,335,892 | B1 * | 12/2012 | Minkin et al. ................ | 711/118 |
| 8,370,609 | B1 * | 2/2013 | Favor et al. ................... | 712/225 |
| 2004/0030834 | A1 * | 2/2004 | Sharma ........................ | 711/122 |
| 2005/0044320 | A1 * | 2/2005 | Olukotun ...................... | 711/118 |
| 2008/0086594 | A1 * | 4/2008 | Chang et al. ................. | 711/118 |
| 2009/0132759 | A1 * | 5/2009 | Kimura et al. ................ | 711/105 |
| 2010/0299481 | A1 * | 11/2010 | Conte et al. ................... | 711/122 |
| 2011/0060879 | A1 * | 3/2011 | Rogers et al. ................. | 711/119 |
| 2011/0197031 | A1 * | 8/2011 | Aho et al. ..................... | 711/130 |
| 2011/0271057 | A1 * | 11/2011 | Karlsson ....................... | 711/122 |
| 2012/0198161 | A1 * | 8/2012 | Chachad ............ | H03K 19/0016 711/122 |

OTHER PUBLICATIONS

The Authoritative Dictionary of IEEE Standards Terms ; 7th Edition; IEEE 2000 pp. 135 and 519.*

(Continued)

*Primary Examiner* — Reginald Bragdon
*Assistant Examiner* — Paul Knight
(74) *Attorney, Agent, or Firm* — Zilka-Kotab, PC

(57) ABSTRACT

A system, method, and computer program product are provided for managing miss requests. In use, a miss request is received at a unified miss handler from one of a plurality of distributed local caches. Additionally, the miss request is managed, utilizing the unified miss handler.

19 Claims, 4 Drawing Sheets

(56) References Cited

OTHER PUBLICATIONS

Busses and Crossbars by Balasubramonian, Pinkston and Hsieh; U of Utah and USC as published on Nov. 10, 2011 at http://www.cs.utah.edu/~rajeev/pubs/encyc11.pdf.*

Design and Implementation of the TRIPS Primary Memory System by Sethumadhavan, McDonald, Desikan, Burger, and Keckler IEEE 2006.*

A High Performance Adaptive Miss Handling Architecture for Chip Multiprocessors by Jahre and Natvig; Springer 2011.*

* cited by examiner

SYSTEM, METHOD, AND COMPUTER PROGRAM PRODUCT FOR MANAGING CACHE MISS REQUESTS

FIELD OF THE INVENTION

The present invention relates to memory management, and more particularly to managing cache miss requests.

BACKGROUND

Caches are widely used in current computing processes. For example, a cache may be used to store data in order to reduce an average time to access memory. However, current techniques for implementing caches have been associated with various limitations.

For example, many computing architectures utilize a single unified L1 cache with a plurality of lanes, where each lane makes load and store accesses to the single L1 cache. This may result in inferior single-threaded performance, latency, efficiency, cache access energy, etc. There is thus a need for addressing these and/or other issues associated with the prior art.

SUMMARY

A system, method, and computer program product are provided for managing miss requests. In use, a miss request is received at a unified miss handler from one of a plurality of distributed local caches. Additionally, the miss request is managed, utilizing the unified miss handler.

DETAILED DESCRIPTION

Figure 1:
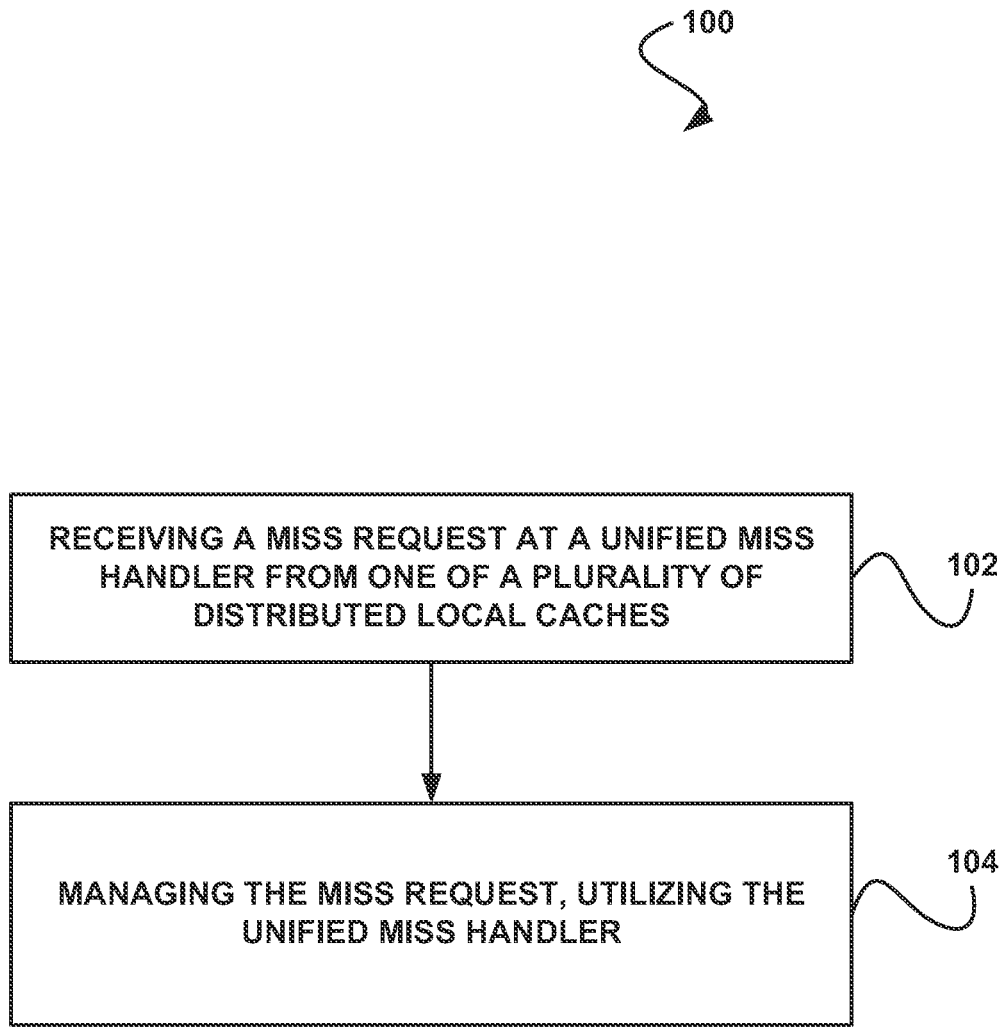
FIG. 1 Shows a method for managing miss requests, in accordance with one embodiment.

FIG. 1 shows a method 100 for managing miss requests, in accordance with one embodiment. As shown in operation 102, a miss request is received at a unified miss handler from one of a plurality of distributed local caches. In one embodiment, each of the plurality of distributed local caches may operate as a level one (L1) cache (e.g., a local cache, etc.). In another embodiment, each of the plurality of distributed local caches may include a data array and an associated tag array. In yet another embodiment, each of the plurality of distributed local caches may be located within a processor (e.g., a parallel processor, multi-core processor, etc.). In still another embodiment, the processor may include a parallel processor with one or more lanes, and may be associated with one or more L1 line sizes and one or more level two (L2) cache or dynamic random access memory (DRAM) request widths.

Additionally, in one embodiment, the plurality of distributed local caches may be located within a plurality of lanes. For example, the plurality of lanes may be located within a parallel processor, and each lane may include a single local cache. In another example, each lane may include a single register file in communication with the single local cache. In yet another example, each lane may include a plurality of arithmetic logic units (ALUs) in communication with the single register file and the single local cache.

Further, in one embodiment, the miss request may be sent from one of the plurality of distributed local caches in response to a load request. For example, a load request may be sent to a cache of the plurality of distributed local caches. Additionally, it may be determined whether the load request results in a hit or miss at the cache. Further, if the load request results in a miss, the miss request is sent to the unified miss handler. Further still, in one embodiment, the miss request may be received at the unified miss handler via a crossbar. For example, a crossbar may enable communication between each of the plurality of distributed local caches and the unified miss handler.

Also, as shown in operation 104, the miss request is managed, utilizing the unified miss handler. In one embodiment, managing the miss request may include storing the miss request in a queue of the unified miss handler. For example, the unified miss handler may include a first in, first out (FIFO) queue in which the miss request is stored. In addition, in one embodiment, managing the miss request may include merging the miss request with additional miss requests. For example, the unified miss handler may merge (e.g., combine, etc.) the miss request with additional miss requests to create a wider request. In this way, smaller cache line size miss requests may be merged into wider requests that may be preferred by level two (L2) cache or dynamic random access memory (DRAM).

Furthermore, in one embodiment, managing the miss request may include performing hit or miss detection for the miss request against data stored in the unified miss handler. In this way, miss-handling state and data storage may be eliminated from distributed local caches and moved to a separate structure (e.g., the miss handler). For example, a wider request created by merging the miss request with additional miss requests may be compared against a tag array of the unified miss handler. In another embodiment, managing the miss request may include requesting the miss data and preparing a data return buffer for the receipt of miss data.

For example, if the comparison of the wider request against the tag array results in a miss, then the unified miss handler may send a request to a level two (L2) cache or to dynamic random access memory (DRAM) and may allocate an entry in a return data buffer of the unified miss handler for the miss data from the L2 cache or DRAM to land in. In another example, if the comparison of the wider request against the tag array results in a hit, then it may be determined that the return data buffer already contains (or will receive from the L2 memory or DRAM) the miss data.

Further still, in one embodiment, managing the miss request may include receiving requested miss data. For example, if miss data was requested from L2 cache or DRAM, the miss data returned from the L2 cache or DRAM may be received by the unified miss handler and stored within the data return buffer of the unified miss handler. In this way, the data return buffer of the unified miss handler may store the returned miss data before sending it back to the local cache. In another embodiment, managing the miss request may include returning the miss data to the local cache that sent the miss request. For example, the miss data may be returned by the unified miss handler to the L1 cache or register the that submitted the miss request to the unified miss handler.

Also, in one embodiment, the requested miss data may be returned in the order in which miss requests are received. In another embodiment, the requested miss data may be returned as soon as the data is received from L2 cache or DRAM. In yet another embodiment, the requested miss data may be returned when one or more predetermined conditions have been met. For example, the requested miss data may be returned when it is determined that the miss data is stored in the data return buffer of the unified miss handler, the destination L1 cache is ready to accept the return data, and the return header associated with the miss data is the first header in a return FIFO of the unified miss handler with valid data ready to return.

Additionally, in one embodiment, the unified miss handler may include a texture cache. For example, a texture cache of a graphics processing unit (GPU) may be modified by adding an L1 store invalidate request path, keeping necessary return header data with outstanding miss requests, and adding flow control to and from lane L1s, such that the texture cache may act as a unified miss handler. In this way, the data storage of the texture cache may be used as a return data buffer of the unified miss handler.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
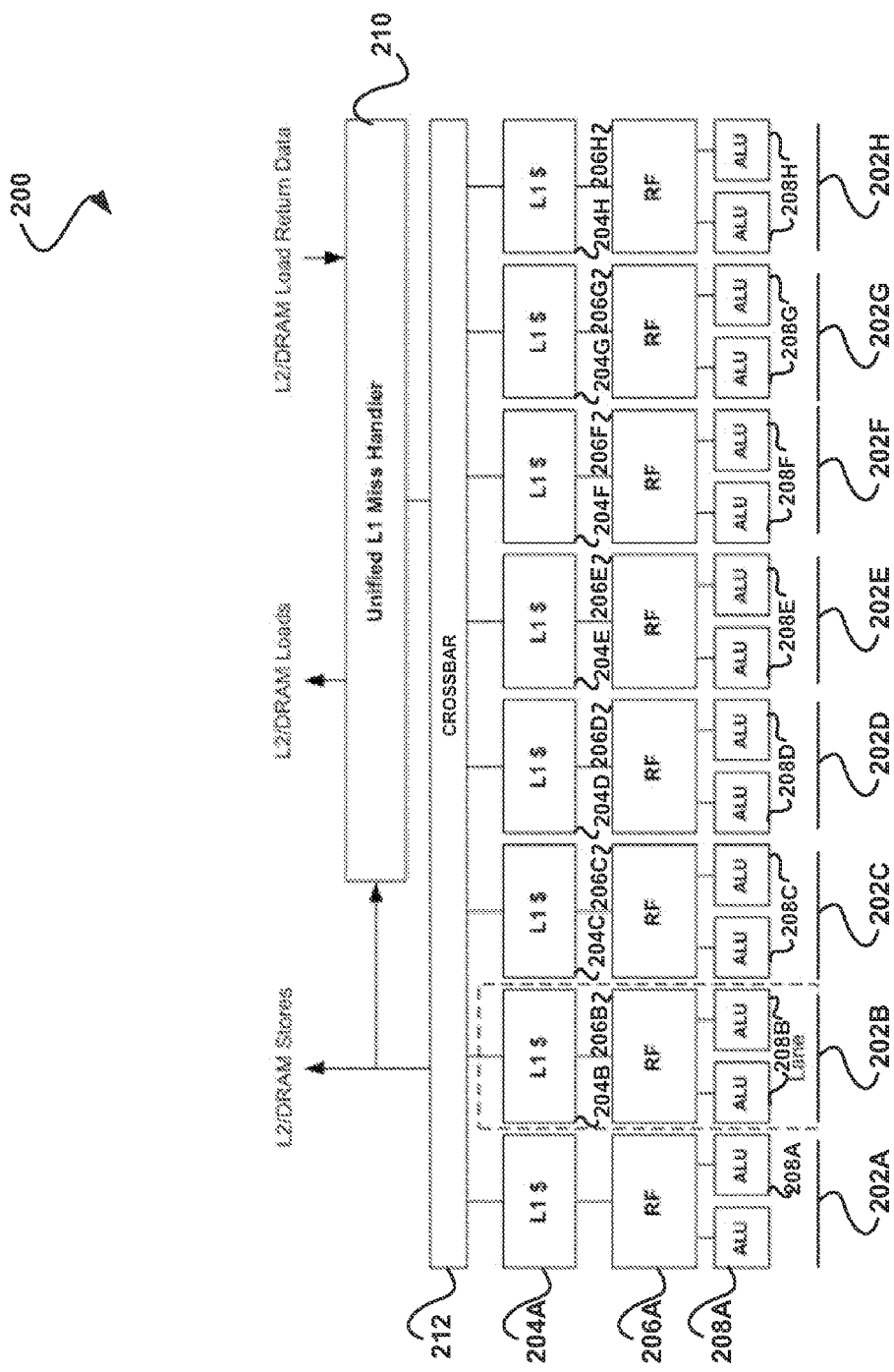
FIG. 2 shows an exemplary parallel processor architecture, in accordance with another embodiment.

FIG. 2 shows an exemplary parallel processor architecture 200, in accordance with another embodiment. As an option, the exemplary architecture 200 may be carried out in the context of the functionality of FIG. 1. Of course, however, the exemplary architecture 200 may be implemented in any desired environment. It should also be noted that the aforementioned definitions may apply during the present description.

As shown, the parallel processor architecture 200 includes eight lanes 202A-H. Additionally, each lane 202A-H includes its own respective local L1 cache 204A-H, register file 206A-H, and ALUs 208A-H. In one embodiment, each local L1 cache 204A-H may contain a data array and an associated tag array. In another embodiment, each local L1 cache 204A-H may have a predetermined line size (e.g., 16 bytes, etc.).

Additionally, in one embodiment, the local L1 caches 204A-H may be treated as independent caches (e.g., in a similar manner as to how a multi-core processor may have an L1 cache per core, etc.). In another embodiment, the local L1 caches 204A-H may be organized as a banked L1 cache, where the local L1 caches 204A-H may be address interleaved. Of course, however, any logical L1 cache organization may be implemented.

Further, the parallel processor architecture 200 includes a unified L1 miss handler 210 in communication with the lanes 202A-H via a crossbar 212. In one embodiment, one or more lanes 202A-H may execute a load instruction, and load requests may first be sent to the respective one or more local L1 caches 204A-H of each of the one or more lanes 202A-H executing a load instruction (either before or after traversing the crossbar 210 depending on an exact logical organization). In another embodiment, tag checks may be performed in the respective local L1 cache 204A-H in response to the received load requests, and after the tag checks are performed, it may be determined whether each of the one or more lane 202A-H's load requests result in a hit or a miss.

Further still, in one embodiment, if it is determined that a particular lane 202A-H's load request results in a hit, load data may be returned back to the respective register file 206A-H of the particular lane 202A-H. In another embodiment, if it is determined that a particular lane 202A-H's load request results in a miss, a miss request may be sent from the particular lane 202A-H to the unified miss handler 210 via the crossbar 212. In this way, all miss requests associated with each lane 202A-H may be sent to the unified miss handler 210.

Also, in one embodiment, the unified miss handler 210 may include data storage for storing in-flight misses from the local L1 caches 204A-H of each of the one or more lanes 202A-H. In another embodiment, the unified miss handler 210 may accept miss requests from one or more of the lanes 202A-H via the crossbar 212, and may then conditionally aggregate the miss requests into L2/DRAM load requests and stage return data until it is ready to be returned to the respective L1 caches 204A-H and register files 206A-H of the one or more lanes 202A-H.

In this way, throughput processors may benefit from having many independently addressed cache banks that may be physically close to execution units. Having many cache banks may benefits bandwidth in general and scatter/gather address bandwidth in particular, which may improve performance on memory-bandwidth-limited applications, (e.g., those with less regular memory access patterns, etc.). Having relatively small caches physically close to execution units may benefit both application performance and processor area efficiency.

Additionally, low-latency L1 cache accesses may improve single-threaded performance because less ILP is needed per thread. Further, low-latency L1 cache access may improve area efficiency of throughput processors because it may reduce the need to hide latency of access with parallel threads of execution. Further still, low-latency L1 cache access may improve the performance of throughput processors because doing tag checks earlier in the execution pipeline may help instruction and thread schedulers make more optimal decisions. Also, physically local low-latency L1 caches reduce the cache access energy. The unified miss handler allows processors to exploit these advantages of distributed local caches without incurring significant costs. In particular, the unified miss handler 210 may allow miss-handling state and reserved data storage that would otherwise be needed for keeping track of all in-flight misses to be eliminated from the L1 caches.

Further still, in one embodiment, an L1 cache line allocation policy may be implemented by the unified L1 miss handler 210 where a load miss may cause a new L1 line allocation, which may evict an existing line within the L1 cache if necessary. In another embodiment, memory consistency may be maintained in the L1 cache tag arrays themselves. For example, when a cache miss is encountered, an L1 cache line may be marked as having an in-flight miss. A load miss request may then be sent off to the unified L1 miss handler 210.

Also, in one embodiment, subsequent miss requests to the same L1 cache line may also be sent to the unified L1 miss handler 210 (but may not generate additional L2/DRAM requests). In another embodiment, when a store miss is encountered, if stores are treated as write-allocate but do not cover the full L1 cache line, they may be treated in a similar manner to load misses, with care taken to avoid overwriting dirty data with stale data once the load miss has returned to the L1 cache.

Additionally, in one embodiment, stores to in-flight load misses may be addressed. Table 1 illustrates exemplary pseudocode for addressing in-flight load misses, in accordance with one embodiment. Of course, it should be noted that the pseudocode shown in Table 1 are set forth for illustrative purposes only, and thus should not be construed as limiting in any manner.

TABLE 1 x = a[idx]
a[idx] = y

For example, if a store to a[idx] was from a different thread than the load from a[idx], then a synchronization event may be required to guarantee memory consistency in this case. In another example, in the case where the load and store are from the same thread, cache line allocation policies may guarantee consistency. For example, when a store to an in-flight load miss is encountered, the appropriate bytes in the L1 cache line may be marked as dirty, and the load miss return data may return directly to registers for the dirty data, which may bypass the cache line update.

Figure 3:
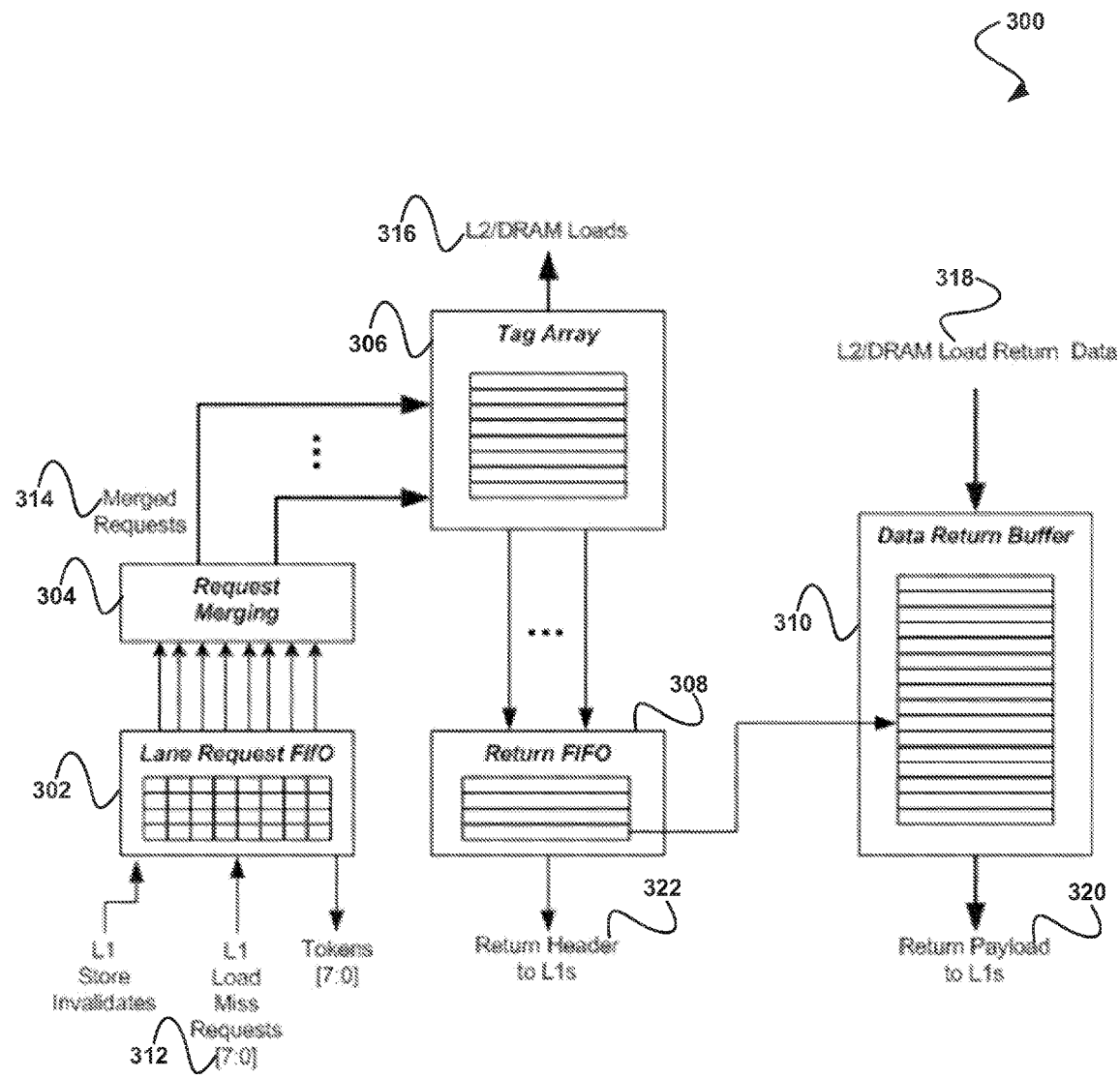
FIG. 3 shows an exemplary unified miss handler, in accordance with another embodiment.

FIG. 3 shows an exemplary unified miss handler 300, in accordance with another embodiment. As an option, the unified miss handler 300 may be carried out in the context of the functionality of FIGS. 1-2. Of course, however, the unified miss handler 300 may be implemented in any desired environment. It should also be noted that the aforementioned definitions may apply during the present description.

As shown, the unified miss handler 300 includes a lane request first in, first out (FIFO) queue 302, a request merging stage 304, a tag array 306, a return FIFO queue 308, and a data return buffer 310. In one embodiment, load miss requests 312 from local L1 caches may be received by the unified miss handler 300 through the lane request FIFO 302. For example, the load miss requests may enter the lane request FIFO 302 using a token-based flow-control protocol.

Additionally, in one embodiment, the load miss requests 312 may conditionally proceed from the lane request FIFO 302 to the request merging stage 304. For example, the load miss requests 312 may proceed from the lane request FIFO 302 to the request merging stage 304 if it is determined that the data return buffer 310 is not full. In this way, storage within the data return buffer 310 may be guaranteed for a new in-flight miss to land.

Further, in one embodiment, the request merging stage 304 may take a plurality of load miss requests 312 and may merge such requests 312 to create merged requests 314. For example, the request merging stage 304 may take miss requests, which may be from relatively small L1 line sizes, and may exploit spatial locality to merge requests at the head of the lane request FIFO 302 into wider requests 314, (e.g., at widths corresponding to the L2 cache line size, etc.). For instance, a processor may have a 16-byte L1 line size which may be merged into 128-byte requests to match a 128-byte L2 line size.

In this way, smaller line sizes in local caches may be maintained, which may be beneficial for performance because they may increase the total number of cache lines per thread and avoid fragmentation-related issues. Additionally, higher-level caches (e.g. L2) or DRAM interfaces, which may prefer larger line sizes to limit tag bandwidth and simplify interfaces, may also be accommodated by merging small cache line-size miss requests into wider requests before being sent to L2 or DRAM.

Further still, in one embodiment, after merging, the addresses within the merged requests 314 may be checked against the tag array 306 for hit/miss detection. In another embodiment, if a miss is detected, a request 316 is sent to L2/DRAM and an entry is allocated in the data return buffer 310 for the returned miss data 318 to land in. Additionally, an entry number within the data return buffer 310 corresponding to the allocated entry may be noted within the tag array 306.

Further, a header may be written into the tail of the return FIFO queue 308 along with the location of the associated data in the data return buffer 310.

In this way, the location of the data in the data return buffer 310 may be de-coupled from the address or location in the tag array 306. Also, the tag array 306 may be organized with arbitrary set associativity (e.g., for a complexity versus performance tradeoff). In one embodiment, hits between the merged requests 314 and the tag array 306 may proceed in the same way as misses except they may not cause an external request 316 to be sent to L2/DRAM.

In addition, in one embodiment, the L2/DRAM load return data 318 may be received from the L2/DRAM in response to the request 316 and may be stored in the data return buffer 310. In another embodiment, the L2/DRAM load return data 318 stored in the data return buffer 310 may then be returned 320 to the local L1 cache that sent the specific load miss request 312 associated with the load return data 318. In yet another embodiment, the return data 320 may be returned in exact request order. In still another embodiment, the return data 320 may be returned out of order once a request 312's data has returned.

Furthermore, in one embodiment, a header 322 of the return data 320 may store information about which bytes from the current return data 320 belong to which local L1 cache. In another embodiment, return data 320 may be sent from the unified miss handler 300 back to one or more L1 caches when one or more conditions are satisfied. For example, return data 320 may be sent from the unified miss handler 300 back to one or more L1 caches when miss data 318 has returned from L2/DRAM into the data return buffer 310. In another example, return data 320 may be sent from the unified miss handler 300 back to one or more L1 caches when the pertinent L1 caches are ready to accept return data. In yet another example, return data 320 may be sent from the unified miss handler 300 back to one or more L1 caches when the return header of the return data 320 is the first header in the return FIFO 308 with valid data ready to return.

Further, in one embodiment, store misses with write-allocate may be handled in a similar manner. In this way, the return header in the unified miss handler may keep track of the requesting lane as well as the destination register for the in-flight load miss. In another embodiment, stores may invalidate any stale data in the unified miss handler. This may be clone by inserting store invalidates into the miss handler lane request FIFO queues. In still another embodiment, the ordering of store invalidates relative to load requests in the lane request FIFO queues may be maintained in order to guarantee consistency.

Further still, in one embodiment, the unified miss handler 300 may include a texture cache. In one embodiment, the texture cache may include a highly associative cache that may be designed for high memory-level parallelism (MLP) and may reduce bandwidth by exploiting a small amount of spatial and temporal locality among in-flight memory requests. In another embodiment, rather than add a new unified miss handler block to a GPU architecture, a GPU texture cache may be modified to support L1 miss handling by adding an L1 store invalidate request path to the texture cache, keeping the necessary return header data with the outstanding miss requests, and adding the necessary flow control to the interface to and from the lane L1 caches. This design may provide a very area- and energy-efficient way to support graphics texture requests and high capacity L1 cache storage and may retain the advantages of distributed local L1s with unified miss handling. In this way, traditional L1 caches and texture caches having two separate paths to L2 and DRAM may be merged to avoid area inefficiencies associated with supporting both paths.

Also, in one embodiment, the unified miss handler 300 may keep track of all in-flight misses and may handle request merging when spatial locality exists. In another embodiment, in logical organizations where the L1 caches are separate caches and not address-interleaved banks, the unified miss handler 300 may help exploit temporal locality between threads resident on different lanes. In yet another embodiment, in logical organizations where the L1 caches are address-interleaved banks, the unified miss handler 300 may provide a level of decoupling between the thread access pattern and the access pattern sent to L2/DRAM. For example, with per-thread sequential access patterns (spatial locality to larger records within a single thread), the unified miss handler 300 request ingress path may be designed to accept many independent address requests per lane per cycle and may merge smaller requests over multiple cycles together.

In addition, in one embodiment, since the unified miss handler 300 contains a return data 310 buffer for storing all in-flight miss data, all un-cached loads may be sent to the unified miss handler 300, which may provide a level of bandwidth filtering with a small set-associative cache before un-cached load requests are sent to L2/DRAM. In another embodiment, in a situation where memory access patterns may camp on one or more sets of a cache, when a load request misses in the L1 cache to a set with 4 in-flight load misses, rather than squashing the load request (and forcing a replay of the instruction at a later time), load miss requests may be sent off to the unified miss handler 300.

More specifically, one of the in-flight loads may be evicted from the L1 tag array and its in-flight return data may return directly to the RE, bypassing the L1 cache linefill. In this way, memory access patterns that may camp on one or more sets of the L1 cache may revert to performance of un-cached loads filtered through the unified miss handler which may have sufficient memory level parallelism (MLP) for full throughput, but may not require the thread to stall. In this way, the ability of certain memory access patterns from creating MLP bottlenecks may be limited.

Furthermore, in one embodiment, compared to CPU architectures with separate L1 and texture cache structures, a CPU with a modified texture cache to support L1 miss handling may have improved area and energy efficiency because it may eliminate the necessity for separate paths to L2/DRAM for L1 misses and texture cache requests.

Figure 4:
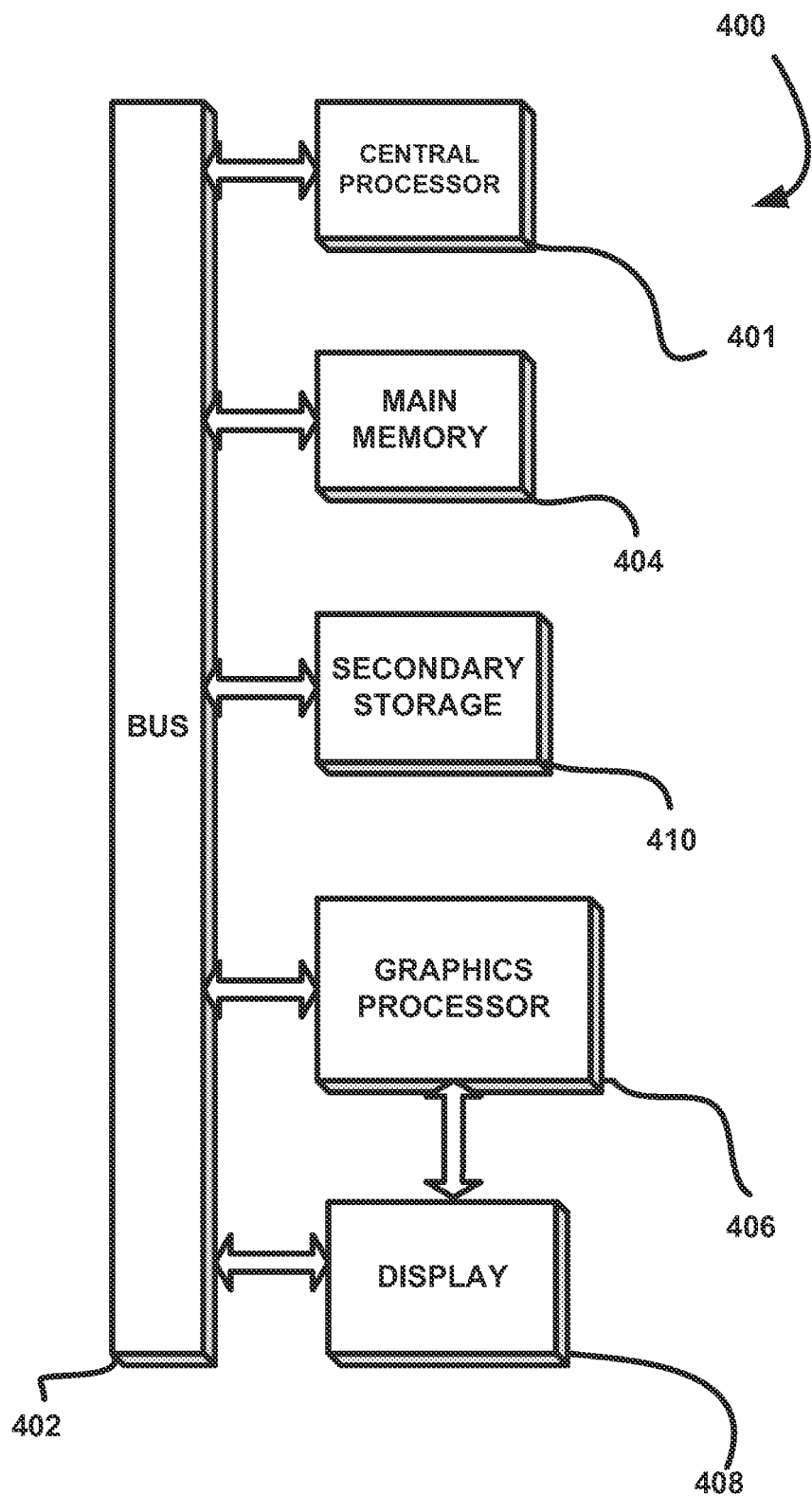
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 44)4 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (CPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, and/or any other type of logic. Still yet, the system 400 may take the form of various other devices no including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a miss request at a unified miss handler from one of a plurality of distributed local caches, wherein each of the plurality of distributed local caches includes a level one (L1) cache; and
managing the miss request at the unified miss handler by:
merging the miss request with additional miss requests from at least one additional distributed local cache in the plurality of distributed local caches to generate a wider request for the L2 cache, and
transmitting the wider request to a level two (L2) cache coupled to the unified miss handler.

2. The method of claim 1, wherein the plurality of distributed local caches are located within a plurality of lanes.

3. The method of claim 2, wherein the plurality of lanes is located within a parallel processor, and each lane includes a single local cache.

4. The method of claim 1, wherein the miss request is sent from one of the plurality of distributed local caches in response to a load request.

5. The method of claim 1, wherein the miss request is received at the unified miss handler via a crossbar.

6. The method of claim 1, wherein managing the miss request includes storing the miss request in a queue of the unified miss handler.

7. The method of claim 6, wherein the unified miss handler includes a first in, first out (FIFO) queue to store a plurality of miss requests.

8. The method of claim 1, wherein managing the miss request includes performing hit or miss detection for the miss request against data stored in the unified miss handler.

9. The method of claim 8, wherein a wider request created by merging the miss request with additional miss requests is compared against a tag array of the unified miss handler.

10. The method of claim 9, wherein managing the miss request includes requesting miss data and preparing a data return buffer for the receipt of the miss data.

11. The method of claim 10, wherein if the comparison of the wider request against the tag array results in a miss, then the unified miss handler sends a request to the L2 cache and allocates an entry in a return data buffer of the unified miss handler for the miss data from the L2 cache.

12. The method of claim 1, wherein managing the miss request includes receiving requested miss data from the L2 cache.

13. The method of claim 12, wherein managing the miss request includes returning the miss data to the distributed local cache that sent the miss request to the unified miss handler.

14. The method of claim 13, wherein a data return buffer of the unified miss handler stores the miss data before sending the miss data back to the distributed local cache.

15. The method of claim 1, wherein the unified miss handler includes:
a first in, first out (FIFO) for storing miss requests from the plurality of distributed local caches;
a request merging stage for combining one or more miss requests into a merged request for the L2 cache;
a tag array for storing tags related to merged requests;
a data return buffer for storing return data received from the L2 cache; and
a return FIFO for storing return headers that point to locations in the data return buffer that store the return data associated with the miss requests.

16. A computer program product embodied on a non-transitory computer readable medium, comprising:
code for receiving a miss request at a unified miss handler from one of a plurality of distributed local caches, wherein each of the plurality of distributed local caches includes a level one (L1) cache; and
code for managing the miss request at the unified miss handler by:
merging the miss request with additional miss requests from at least one additional distributed local cache in the plurality of distributed local caches to generate a wider request for the L2 cache, and
transmitting the wider request to a level two (L2) cache coupled to the unified miss handler.

17. A system, comprising:
a plurality of distributed local caches, wherein each of the plurality of distributed local caches includes a level one (L1) cache;
a level two (L2) cache,
a unified miss handler coupled between the plurality of distributed local caches and the L2 cache, the unified miss handler configured to:
receive a miss request from one of the plurality of distributed local caches, and
manage the miss request by:
merging the miss request with additional miss requests from at least one additional distributed local cache in the plurality of distributed local caches to generate a wider request for the L2 cache, and
transmitting the wider request to a level two (L2) cache coupled to the unified miss handler.

18. The system of claim 17, wherein the unified miss handler is in communication with the plurality of distributed local caches via a crossbar.

19. The system of claim 17, wherein the unified miss handler includes:
a first in, first out (FIFO) for storing miss requests from the plurality of distributed local caches;
a request merging stage for combining one or more miss requests into a merged request for the L2 cache;
a tag array for storing tags related to merged requests;
a data return buffer for storing return data received from the L2 cache; and
a return FIFO for storing return headers that point to locations in the data return buffer that store the return data associated with the miss requests.

* * * * *